United States Patent [19]

Cook

[11] Patent Number: 4,658,757
[45] Date of Patent: Apr. 21, 1987

[54] METHOD AND APPARATUS FOR IMPROVED AQUACULTURE/MARICULTURE

[75] Inventor: Harry L. Cook, Port Lavaca, Tex.

[73] Assignee: Ocean Ventures-1, Port Lavaca, Tex.

[21] Appl. No.: 797,872

[22] Filed: Nov. 14, 1985

[51] Int. Cl.[4] ............................................. A01K 63/06
[52] U.S. Cl. ...................................................... 119/3
[58] Field of Search ........................................ 119/2, 3

[56] References Cited

U.S. PATENT DOCUMENTS

| | | | |
|---|---|---|---|
| 1,643,273 | 9/1927 | Imhoff | 119/3 X |
| 2,822,329 | 2/1958 | Griffith | 119/3 X |
| 3,320,928 | 5/1967 | Smith | 119/3 |
| 3,916,832 | 11/1975 | Sweeney | 119/2 |
| 3,998,186 | 12/1976 | Hodges | 119/2 |
| 4,399,770 | 8/1983 | Knowles et al. | 119/3 |
| 4,593,647 | 6/1986 | Sorgeloos et al. | 119/2 |

FOREIGN PATENT DOCUMENTS 0104702 4/1984 European Pat. Off. ............... 119/2

OTHER PUBLICATIONS

"Development of an Intensive Shrimp Culture System in Kuwait!", by D. C. Kneale, A. B. Al-Hajj, E. C. L. Maynard and A. S. D. Farmer, *J. World Maricul. Soc.*, 12(2): 15-26 (1981).

"Controlled-Environment Aquaculture", by L. E. Mahler, John E. Groh and Carl N. Hodges, Proc. 5th Annu. Workshop, World Mariculture Society, 1974, pp. 379-383.

Primary Examiner—Hugh R. Chamblee
Attorney, Agent, or Firm—Browning, Bushman, Zamecki & Anderson

[57] ABSTRACT

A method and apparatus for controlling water temperature in a man-made pond includes means defining a closed loop raceway within the pond with at least a pump mounted to circulate the water in the raceway. At least a portion of the raceway is covered by a cover which will absorb heat and release a portion thereof into the water as it passes along the raceway below the cover. The pump is preferably arranged to draw cool water from the bottom of the raceway and eject it under the cover at the surface of the pond thereby assuring more uniform water temperature.

18 Claims, 5 Drawing Figures

METHOD AND APPARATUS FOR IMPROVED AQUACULTURE/MARICULTURE

BACKGROUND OF THE INVENTION

1. Field of the Invention

The present invention relates to an improved method and apparatus for aquaculture and/or mariculture which controls the water temperature and dissolved oxygen content in the water for improved harvest.

2. Description of the Prior Art

The advantages of aquaculture and/or mariculture over natural fishing have long been sufficiently apparent as to merit extensive work in this area. For example, it is clear that if food sources can be raised in controlled ponds, then the dangers of going out into the open sea will obviously be eliminated. Conventional fishing is fraught with dangers including the risk to the sailors, the possible loss of the boat, the difficulty in finding fish, the expenses of modern equipment including electronic detecting devices, marine insurance costs, labor costs, repair costs and the ever present danger of destructive weather and the hazards of marine environment on equipment. While aquaculture and/or mariculture appear to solve many of these problems, they still have not overcome all problems and, in fact, have revealed several of their own inherent problems which are not to be found in natural situations. For example, while an aquaculture and/or mariculture situation is able to control pollution, is free of predators and most destructive weather conditions, it is subject to both the difficulties of water temperature control and controlling the amount of dissolved oxygen in the water, both of which directly affect sustaining and growth of aquatic and/or marine animals.

Considering the water temperature problem first, aquaculture and/or mariculture are commonly practiced in man-made ponds located adjacent natural water supplies. The size, depth and geographic location of the ponds will have definite effects on the water temperature. If, for example, the pond is to be used to raise crustaceans, such as shrimp, then the pond preferably should have a depth of approximately two to four feet (0.61–1.22 meters). However, even at this shallow depth, the bottom layers of water may never reach the temperature of 85° F. (29.4° C.) which is ideal for the maximum rate of growth of shrimp. The primary difficulty lies in the fact that while the water absorbs heat from sunlight during the day, it also radiates heat from its surface during the night.

The prior attempts at overcoming this problem have included utilizing pool covers which provide a "greenhouse" effect which will absorb extra heat during the day and will slow down radiant heat escaping from the pool surface during the night. One example may be found in U.S. Pat. No. 3,998,186. This approach has worked to a certain extent, but still has the problem of temperature control in that during hot summer months the cover may cause temperatures to rise to an excessive amount and necessitate the use of fans, blowers or the like to circulate air under the cover during daylight hours to prevent the water temperature from rising too high. Other approaches to solving this temperature control problem have included the use of mechanisms to open or close the cover, which mechanisms are either manually or automatically operated in response to air or water temperature sensing devices. While to a certain extent these devices may result in proper water temperature control, they do add significantly to the cost of the operation.

Considering now the problem of dissolved oxygen, and again using shrimp as an example, if the amount of oxygen in the water drops below two parts per million, then shrimp will die. In order to have a desirable amount of growth, the shrimp require at least four parts per million of dissolved oxygen in the water. There are a number of known techniques for getting oxygen into water, such as the use of aerators. However, there are certain problems that are associated with the use of aerators, one being that they require approximately three horsepower per acre to operate, and they are primarily only surface acting in that the dissolved oxygen does not get mixed all the way to the bottom of the pond. This mixing of oxygenated water is particularly important in the aquaculture/mariculture of shrimp since shrimp are bottom dwelling animals and would need oxygen near the bottom of the pond.

At least two other factors must be considered regarding the oxygen content of the water. One is the decomposition of uneaten feed and waste accumulating on the bottom of the pond which uses up the oxygen at the bottom of the pond and causes the bottom of the pond to become foul. This can also cause the generation of harmful natural chemicals, such as hydrogen sulfide and methane, both of which are toxic to shrimp. Another factor is the algae which will be in any pond and which, when exposed to adequate sunlight, become generators of oxygen. However, sunlight does not normally penetrate more than about 24 inches (60 cm) of water so that algae below this level could be oxygen consumers rather than oxygen generators. Circulation of phytoplankton from the bottom to the surface in a continuous circulation thus becomes a desirable objective.

SUMMARY OF THE INVENTION

It therefore is an object of the present invention to provide a method and apparatus for aquaculture/mariculture which is energy efficient, inexpensive to operate, and which will provide for improved yield. The present invention includes a pool having means to define at least one continuous raceway through the pool, at least one pump means mounted in the pool so as to cause circulation of the water about each raceway and cover means covering a portion of each raceway in the pool providing a greenhouse effect to warm the water passing thereunder.

BRIEF DESCRIPTION OF THE DRAWINGS

The present invention will be described, by way of example, with reference to the accompanying drawings in which.

DESCRIPTION OF THE PREFERRED EMBODIMENTS

Figure 1:
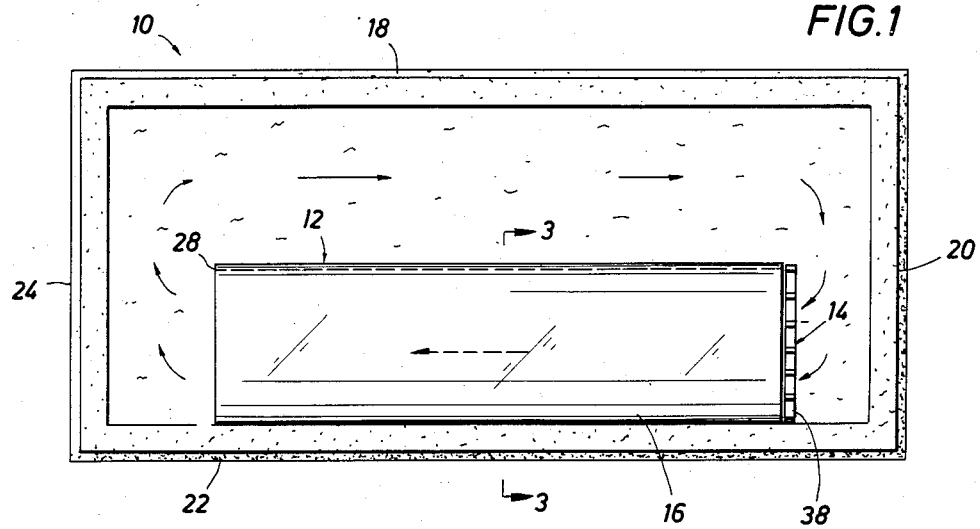
FIG. 1 is a plan view of an aquaculture/mariculture pool according to the present invention.

The present invention is shown in plan view in FIG. 1 and includes a pond 10, means 12 defining a raceway, water circulation means 14 and a cover 16. The typical man-made aquaculture/mariculture pond 10 has a regular geometric form defined by integral intersecting dikes 18, 20, 22, 24 surrounding a substantially flat bottom 26. If desired, the dikes and the bottom of the pool can be lined with an impervious material, such as plastic sheeting (not shown), to prevent erosion of the dikes, leakage of the water into the subsoils, and leaching of minerals or other deposits from the dikes and subsoil into the pond water. The pond is provided with a water supply (not shown) arranged to maintain a fairly constant water level in the pond.

Figure 2:
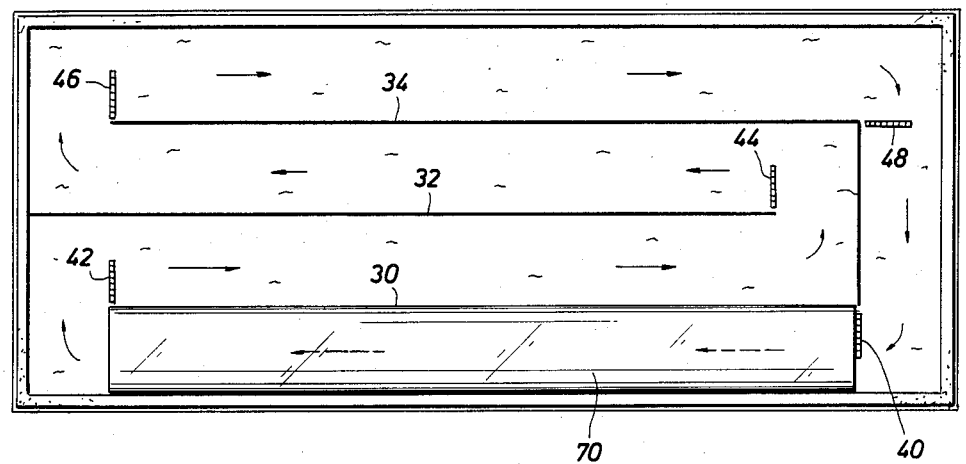
FIG. 2 is a plan view of a larger aquaculture/mariculture pool including the features of the present invention.
Figure 3:
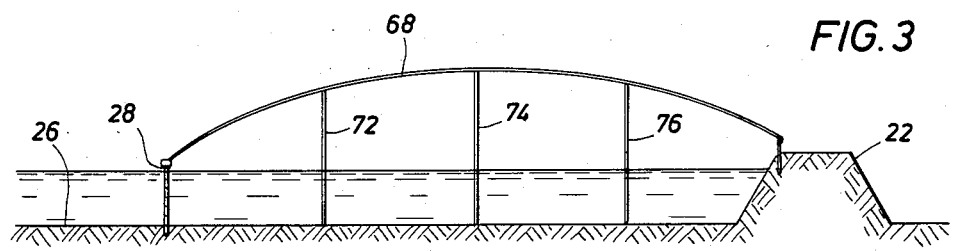
FIG. 3 is a partial section taken along line 3—3 of FIG. 1.

A single divider 28 is shown in FIG. 1 fixedly mounted extending normal to the bottom of the pool, preferably extending along the major dimension thereof, to define a closed path raceway about the pool. The number and positioning of the dividers will clearly be dependent on the size and shape of the pool, as will be readily noted by comparing FIGS. 1 and 2. FIG. 2, represents a larger pool and has four fixed dividers 30, 32, 34 and 36 defining a serpentine raceway about the pool. It will be appreciated by those skilled in the art that the particular profile formed by the dividers does not constitute a part of the invention and may be adapted for any suitable shape to accommodate local considerations. Pools for aquaculture/mariculture are generally 2 to 10 acres (80 to 400 km$^2$) in size making the divider/raceway arrangement a convenient way to assure full and adequate circulation of the water in the pool.

The pool is also provided with at least one pump 38, here shown as an air lift pump described in detail below. The larger pool in FIG. 2 has a plurality of pumps 40, 42, 44, 46, 48, in order to provide adequate aeration and circulation of the water. While the type, number and location of the pumps are not critical to the present invention, they should be positioned to assure flow of cool water beneath the cover to be warmed.

Figure 4:
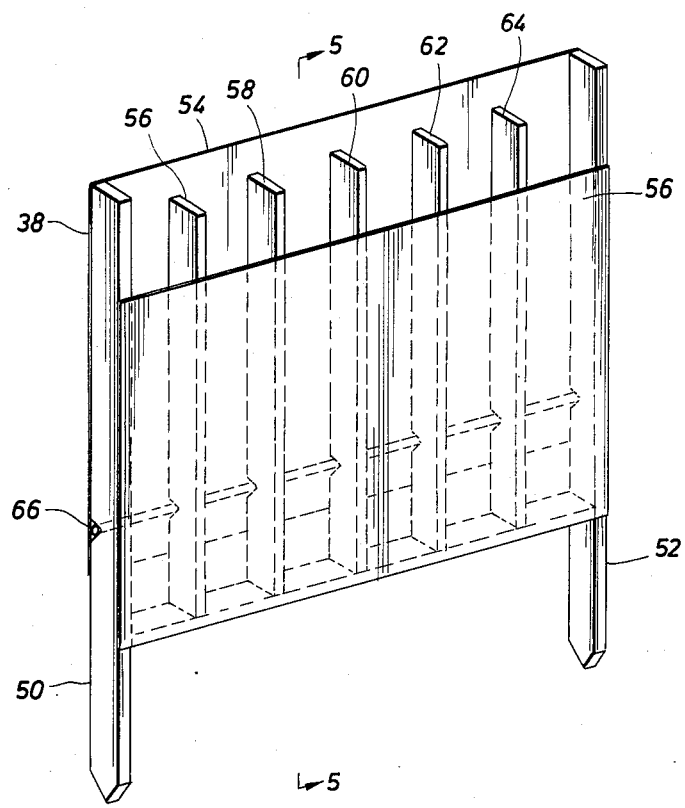
FIG. 4 is a perspective view of an airlift pump according to the present invention.
Figure 5:
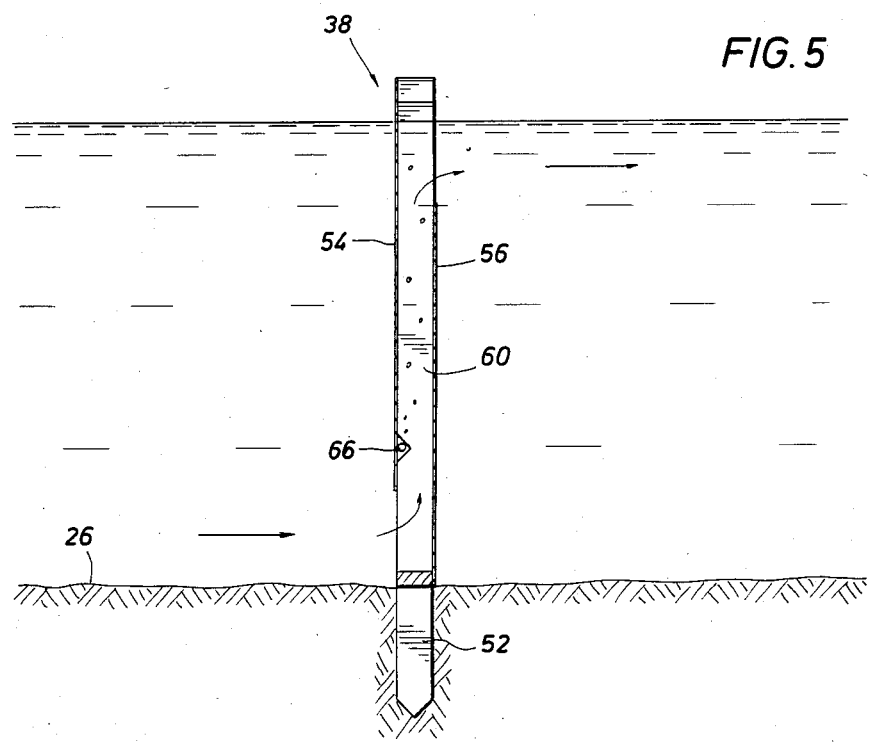
FIG. 5 is a section taken along 5—5 of FIG. 4.

An air lift pump is shown in more detail in FIGS. 4 and 5. Each air lift pump has a pair of spaced end mounting posts 50, 52 joined by parallel spaced front (upstream) and rear (downstream) plates 54, 56. The front and rear plates are vertically offset one from the other so that the lower edge of the front plate 54 is spaced from the bottom of the pool and the upper edge of the rear plate 56 is spaced below the surface of the water. A plurality of vertical baffles 58, 60, 62, 64 are mounted in fixed, parallel, spaced relation between the front and rear plates. At least one perforated pipe 66 is fixedly mounted extending horizontally through the air lift near the bottom of the front plate. The pipe is connected to an air blower (not shown) and, when in position and the air is passing through the pipe, will cause the aeration and circulation of the water in the pond, as noted by the arrows in FIGS. 1, 2 and 5.

A portion of the pool is enclosed under a cover 68, 70 which has one end anchored to the dike 22 and the other to a divider 28, 30. It is assumed that the span of the cover will make it necessary to include suports 72, 74, 76 and such other frame members, such as ribs and trusses, (not shown) as may be necessary to adequately support the cover 68, 70 above a portion of the pool.

The operation of a pool, in accordance with the present invention, is such that the water is constantly circulated and aerated by the pumps, and a portion of the cool water is constantly passed under the cover which acts as a heat accumulator transferring heat to the warm water. By controlling the percentage of the pool that is covered and the velocity of circulation of the water, the temperature of the water can be adequately controlled.

With such an arrangement, it is possible to extend the growing season so that as many as three crops of shrimp can be grown and harvested in a single year in temperate regions.

While the above description has been made primarily with reference to shrimp, it should be readily appreciated that the method and apparatus of the present invention can likewise be used for other forms of aquaculture/mariculture.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. A method of controlling the temperature of water in a closed pond used for aquaculture/mariculture, said method comprising the steps of:
   defining a closed circuit raceway in a closed pond;
   mounting in said raceway at least one pump adapted to circulate water about the raceway; and
   placing a cover over at least a portion of said raceway creating a greenhouse effect to warm the water passing thereunder by solar heating.

2. A method according to claim 1 wherein said pump draws water from the bottom of the raceway and ejects it at its surface of the pond at the upstream end of said cover whereby the water passing under the cover will be heated to a substantially uniform temperature.

3. A method according to claim 1 further comprising the step of aerating said water.

4. An aquaculture/mariculture system comprising:
   means forming an impoundment for holding a volume of water;
   means disposed in said impoundment and defining a closed circuit raceway within said impoundment;
   means mounted in said impoundment to circulate water about said raceway; and
   means covering at least a portion of said raceway forming a greenhouse whereby solar heat is collected and transferred to said water passing thereunder to raise the temperature of the water to a controlled level.

5. A system according to claim 4 wherein said impoundment defines a regular geometric shape.

6. A system according to claim 4 wherein said means to circulate water comprises at least one air lift pump adapted to aerate the water as it is circulated.

7. A system according to claim 4 wherein said means to circulate water is adapted to draw cool water from the bottom of said raceway and eject it at the surface of the pool upstream of said cover whereby the water will be heated and circulated to a substantially uniform temperature in the pool.

8. An aquaculture/mariculture system comprising:
   means defining a closed pool of water with substantially uniform depth;
   means to circulate water in said pool; and
   cover means overlying not more than half the surface of the pool and being closely spaced from the surface of the water whereby solar heat is collected and transferred to said water by day and radiant heat loss is reduced at night to keep the water at a fairly uniform temperature.

9. The system according to claim 8 wherein said means defining a closed pool of water comprises a plurality of intersecting dikes defining a rectangular pool.

10. The system according to claim 8 further comprising impervious means lining said pool to prevent leakage of water from the pool and leaching of material from formations around the pool.

11. The system according to claim 8 wherein said pool is approximately four feet deep with a substantially flat bottom.

12. The system according to claim 8 wherein said means to circulate water further comprises means defining a closed loop raceway in said pool, said cover means overlying a portion of said raceway.

13. The system according to claim 8 wherein said means to circulate water includes means to aerate said water.

14. The system according to claim 8 wherein said means to circulate water is an air lift pump.

15. The system according to claim 8 wherein said means to circulate water circulates the water about said pool as well as from bottom to top of the water.

16. The system according to claim 8 wherein at least one means to circulate water is adjacent an entry end of said cover means whereby cool water is circulated to the surface of the water to be heated as it passes under the cover.

17. The system according to claim 8 wherein said cover means is cantilevered.

18. The system according to claim 8 further comprising means supporting said cover means.

* * * * *